(12) United States Patent
Cumbo

(10) Patent No.: US 10,801,245 B2
(45) Date of Patent: Oct. 13, 2020

(54) POWER DOOR WITH TOOTHED ROD CRANK MECHANISM

(71) Applicant: MAGNA CLOSURES INC., Newmarket (CA)

(72) Inventor: Francesco Cumbo, Pisa (IT)

(73) Assignee: MAGNA CLOSURES INC., Newmarket, Ontario (CA)

(*) Notice: Subject to any disclaimer, the term of this patent is extended or adjusted under 35 U.S.C. 154(b) by 185 days.

(21) Appl. No.: 16/161,592

(22) Filed: Oct. 16, 2018

(65) Prior Publication Data

US 2019/0112859 A1 Apr. 18, 2019

Related U.S. Application Data

(60) Provisional application No. 62/573,858, filed on Oct. 18, 2017.

(51) Int. Cl.
*E05F 11/24* (2006.01)
*E05F 15/619* (2015.01)
(Continued)

(52) U.S. Cl.
CPC ............ *E05F 15/619* (2015.01); *B60J 5/047* (2013.01); *F16H 1/28* (2013.01); *F16H 55/26* (2013.01);
(Continued)

(58) Field of Classification Search
CPC .......... F16H 55/26; F16H 1/28; F16H 1/2818; F16H 1/00; F16H 1/125; F16H 37/04; F16H 2025/2071; B60J 5/047; B60J 5/0472; B60J 5/0473; E05F 15/619; E05F 15/624; E05F 15/63; E05F 15/631; E05Y 2900/531;
(Continued)

(56) References Cited

U.S. PATENT DOCUMENTS 5,346,272 A 9/1994 Priest et al.
5,907,885 A * 6/1999 Tilli ........................ B60S 1/185
15/250.15
(Continued)

FOREIGN PATENT DOCUMENTS

CN 109252781 A 1/2019
CN 109339617 A 2/2019
(Continued)

*Primary Examiner* — Chi Q Nguyen
(74) *Attorney, Agent, or Firm* — Dickinson Wright PLLC

(57) ABSTRACT

A power swing door actuator configured for use in a power door actuation system in a motor vehicle having a vehicle door pivotably connected to a vehicle body for movement along a swing path between open and closed positions is provided. The power swing door actuator includes a power-operated drive mechanism connected to the vehicle door with a rotary driven member configured for rotation in response to selective actuation of the power-operated drive mechanism. An elongate rack pivotably connected to the vehicle body and the rotary driven member is maintained in engagement with the rack via a retention member. Rotational movement of the rotary driven member in a first direction causes the vehicle door to move in an opening direction, while rotational movement of the rotary driven member in a second direction causes the vehicle door to move in a closing direction.

20 Claims, 13 Drawing Sheets

(51) Int. Cl.
  *B60J 5/04* (2006.01)
  *F16H 1/28* (2006.01)
  *F16H 55/26* (2006.01)

(52) U.S. Cl.
  CPC ... *E05Y 2201/434* (2013.01); *E05Y 2201/716* (2013.01); *E05Y 2201/722* (2013.01); *E05Y 2900/531* (2013.01)

(58) Field of Classification Search
  CPC ......... E05Y 2201/722; E05Y 2201/434; E05Y 2201/716; E05Y 2201/726; E05Y 2201/438
  USPC .................. 49/341, 339, 342, 324, 340, 343
  See application file for complete search history.

(56) References Cited

U.S. PATENT DOCUMENTS

| | | | | |
|---|---|---|---|---|
| 6,026,536 | A * | 2/2000 | Miller | B60S 1/18 15/250.13 |
| 6,516,567 | B1 * | 2/2003 | Stone | E05F 15/622 296/55 |
| 6,681,444 | B2 | 1/2004 | Breed et al. | |
| 7,438,346 | B1 | 10/2008 | Breed | |
| 7,445,257 | B2 * | 11/2008 | Muller | E05B 81/78 292/336.3 |
| 8,011,136 | B2 * | 9/2011 | Fukumura | E05F 15/646 475/338 |
| 9,174,517 | B2 | 11/2015 | Scheuring et al. | |
| 10,655,378 | B2 * | 5/2020 | Podkopayev | F16H 37/04 |
| 10,669,766 | B2 * | 6/2020 | Sakiyama | F16H 21/44 |
| 2009/0120002 | A1 * | 5/2009 | Domholt | E05F 15/619 49/340 |
| 2009/0200830 | A1 * | 8/2009 | Paton | E05F 15/622 296/146.8 |
| 2014/0224045 | A1 * | 8/2014 | Kummer | F16H 19/02 74/60 |
| 2015/0240548 | A1 | 8/2015 | Bendel et al. | |
| 2018/0051502 | A1 * | 2/2018 | Roos | E05B 81/34 |
| 2018/0179788 | A1 * | 6/2018 | Oxley | E05B 81/13 |
| 2018/0258682 | A1 * | 9/2018 | Schatz | E05F 15/614 |

FOREIGN PATENT DOCUMENTS

| | | |
|---|---|---|
| DE | 102007026796 A1 | 8/2008 |
| EP | 1982030 B1 | 9/2010 |
| EP | 2895673 B1 | 5/2018 |
| WO | WO2016173579 A1 | 11/2016 |
| WO | WO2017137030 A1 | 8/2017 |

* cited by examiner

POWER DOOR WITH TOOTHED ROD CRANK MECHANISM

CROSS-REFERENCE TO RELATED APPLICATION

This application claims the benefit of U.S. Provisional Application Ser. No. 62/573,858, filed Oct. 18, 2017, which is incorporated herein by reference in its entirety.

FIELD

The present disclosure relates generally to power door systems for motor vehicles and, more particularly, to a power door actuator operable for swinging a vehicle door in pivoting relation relative to a vehicle body between an open position and a closed position.

BACKGROUND

This section provides background information related to the present disclosure which is not necessarily prior art.

Passenger doors on motor vehicles are typically mounted by upper and lower door hinges to the vehicle body for swinging movement about a generally vertical pivot axis. Each door hinge typically includes a door hinge strap connected to the passenger door, a body hinge strap connected to the vehicle body, and a pivot pin arranged to pivotably connect the door hinge strap to the body hinge strap and define the pivot axis. Such swinging passenger doors ("swing doors") have recognized issues such as, for example, when the vehicle is situated on an inclined surface and the swing door either opens too far or swings shut due to the unbalanced weight of the door. To address this issues, most passenger doors have some type of detent or check mechanism integrated into at least one of the door hinges that functions to inhibit uncontrolled swinging movement of the door by positively locating and holding the door in one or more mid-travel positions in addition to a fully-open position.

As a further advancement, power door actuation systems have been developed which function to automatically swing the passenger door about its pivot axis between the open and closed positions. Typically, power door actuation systems include a power-operated device such as, for example, an electric motor and a rotary-to-linear conversion device that are operable for converting the rotary output of the electric motor into translational movement of an extensible member. In most arrangements, the electric motor and the conversion device are mounted to the passenger door and the distal end of the extensible member is fixedly secured to the vehicle body. One example of a power door actuation system is shown in commonly-owned U.S. Pat. No. 9,174,517 which discloses a power swing door actuator having a rotary-to-linear conversion device configured to include an externally-threaded leadscrew rotatively driven by the electric motor and an internally-threaded drive nut meshingly engaged with the leadscrew and to which the extensible member is attached. Control over the speed and direction of rotation of the leadscrew results in control over the speed and direction of translational movement of the drive nut and the extensible member, thereby controlling the swinging movement of the passenger door between its open and closed positions.

While such power door actuation systems function satisfactorily for their intended purpose, one recognized drawback relates to their need for specialized packaging and mounting requirements. Accordingly, the application of such power door actuation systems are generally customized for specific vehicle applications, requiring unique mounting configurations particular to the specific vehicle. Accordingly, the aforementioned power door actuation systems are generally not useful for other than the custom vehicle application intended. Further yet, these custom integrated power door actuation systems are elaborate and relatively costly, and thus, are typically reserved for higher end vehicle platforms where cost is generally less of a concern to the consumer.

In view of the above, there remains a need to develop alternative power door actuation systems which address and overcome packaging and mounting limitations associated with known door actuation systems as well as to provide increased applicability while reducing cost and complexity.

SUMMARY

This section provides a general summary of the present disclosure and is not a comprehensive disclosure of its full scope or all of its features, aspects and objectives.

It is an aspect of the present disclosure to provide a power door actuation system including a power door actuator for use in motor vehicles which is operable for moving a vehicle door between open and closed positions relative to a vehicle body.

It is another aspect of the present disclosure to provide a vehicle door having a power swing door actuator for pivoting the vehicle door relative to a vehicle body about a first axis between a closed position and an open position is provided.

It is another aspect of the present disclosure to provide a power swing door actuator for use with swing doors in motor vehicles having a power-operated drive mechanism that can be effectively mounted within the internal cavity of the swing door and configured to cooperatively interact with an elongate rack, of the actuator, having an end pivotally connected to the vehicle body.

It is a further related aspect of the present disclosure to provide the power swing door actuator for use with a vehicle swing door wherein the actuator is pivotally supported by at least one of an A-pillar (front door application) and/or B-pillar (rear door application).

It is a further related aspect of the present disclosure to provide the power-operated drive mechanism with a motor-driven spindle configured to convert rotation of a rotary driven pinion gear into corresponding linear movement of an elongate toothed rack.

It is a further related aspect of the present disclosure to provide the power swing door actuator as being readily interchangeable with an existing mechanical door detent (also known as a door check) and being mountable to an existing mount structure thereof without having to customize the existing mount structure.

It is a further related aspect of the present disclosure to provide the elongate toothed rack as being able to traverse an arced, non-linear swing path in response to the vehicle door being pivoted between opened and closed positions without substantially increasing frictional resistance within the power swing door actuation system, thereby avoiding binding of the power swing door actuator and enhancing the efficiency thereof, which in turn minimizes the power output required of a motor of the actuator.

It is a further related aspect of the present disclosure to maintain the elongate toothed rack in meshed engagement with the driven pinion gear by capturing the elongate toothed rack between the driven pinion gear and a single retention member, wherein the single retention member allows for relative rotation and arced travel of the elongate toothed rack about the driven pinion gear to facilitate movement of the elongate toothed rack along its arced, non-linear swing path.

It is a further related aspect of the present disclosure to provide the elongate toothed rack having a tapered lengthwise extending edge to facilitate movement of the elongate toothed rack along its non-linear swing path without binding between the driven pinion gear and the retention member.

In accordance with these and other aspects, the power swing door actuator of the present disclosure is configured for use in a power door actuation system in a motor vehicle having a vehicle body defining a door opening and a vehicle door pivotably connected to the vehicle body for pivotal movement along a swing path between open and closed positions. The power swing door actuator includes a power-operated drive mechanism connected to the vehicle door with a rotary driven member connected thereto for rotation in response to selective actuation of the power-operated drive mechanism. The power swing door actuator further includes an elongate rack pivotably connected to the vehicle body. The rotary driven member is maintained in engagement with the elongate rack via a retention member, wherein rotational movement of the rotary driven member in a first direction causes the vehicle door to move in an opening direction from the closed position toward the open position, while rotational movement of the rotary driven member in a second direction causes the vehicle door to move in a closing direction from the open position toward the closed position.

In accordance with another aspect of the present disclosure, the elongate rack can be captured between the rotary driven member and the retention member while the rotary driven member traverses along the length of the elongate rack in a first direction to move the door in an opening direction from the closed position toward the open position and while the rotary driven member traverses along the length of the elongate rack in a second direction opposite the first direction to move the door in a closing direction from the open position toward the closed position.

In accordance with another aspect of the present disclosure, the driven rotary member can be provided as a pinion gear and the elongate rack can be provided as a toothed rack, wherein the pinion gear is maintained in meshed engagement with the toothed rack via the retention member.

In accordance with another aspect of the present disclosure, the retention member can be provided as a single retention member allowing relative rotation and arced travel of the elongate toothed rack relative to the pinion gear without substantially increasing frictional resistance between within the power door actuation system.

In accordance with another aspect of the present disclosure, the elongate rack has a first side and an opposite second side extending from the proximal end to the distal end, with the first side facing the pinion gear and the second side can be provided having a tapered surface, wherein the retention feature engages the second side and traverses the tapered surface as the vehicle door moves between the open position and closed position.

In accordance with another aspect of the present disclosure, the tapered surface forms a width extending from the first side to the second side, wherein the width constantly decreases along a direction extending toward the distal end to accommodate pivoting movement of the rack to prevent binding of the rack as the door moves between closed and open positions.

In accordance with another aspect of the present disclosure, the elongate rack has a first side and an opposite second side extending from the proximal end to the distal end, wherein the retention feature can be formed as a through slot configured for receipt of a shaft of the rotary driven member for translation therein, with the through slot having an elongate, non-linear centerline extending between the proximal end and the distal end intermediate the first side and the second side to accommodate pivoting movement of the rack to prevent binding of the rack as the door moves between closed and open positions.

In accordance with another aspect of the present disclosure, the centerline of the through slot can be provided having a generally S-shaped trajectory, wherein the generally S-shaped trajectory can be provided having a varying radii of curvature to allow free pivoting movement of the rack with binding as the door moves between closed and open positions.

In accordance with another aspect of the present disclosure, a method for pivoting a vehicle door relative to a vehicle body about a first axis between a closed position and an open position is provided. The method includes attaching a power-operated drive mechanism to the vehicle door and connecting a proximal end of an elongate rack to the vehicle body for pivotal movement about a second axis spaced from the first axis. Further, providing a rotary driven member coupled to the power-operated drive mechanism to be driven in response to selective actuation of the power-operated drive mechanism to cause the vehicle door to move between the open position and closed position as the rotary driven member traverses along the elongate rack. Further yet, providing a retention feature and maintaining the rotary driven member in engagement with the elongate rack with the retention feature; and, permitting the elongate rack to oscillate about the second axis as the rotary driven member traverses along the elongate rack.

Further areas of applicability will become apparent from the description provided herein. The description and specific embodiments listed in this summary are for purposes of illustration only and are not intended to limit the scope of the present disclosure.

BRIEF DESCRIPTION OF THE DRAWINGS

These and other objects, features and advantages of the present disclosure will be readily appreciated by one possessing ordinary skill in the art, as the same becomes better understood by reference to the following detailed description when considered in connection with the appended claims and accompanying drawings, wherein:

DETAILED DESCRIPTION OF EXAMPLE EMBODIMENTS

Figure 1:
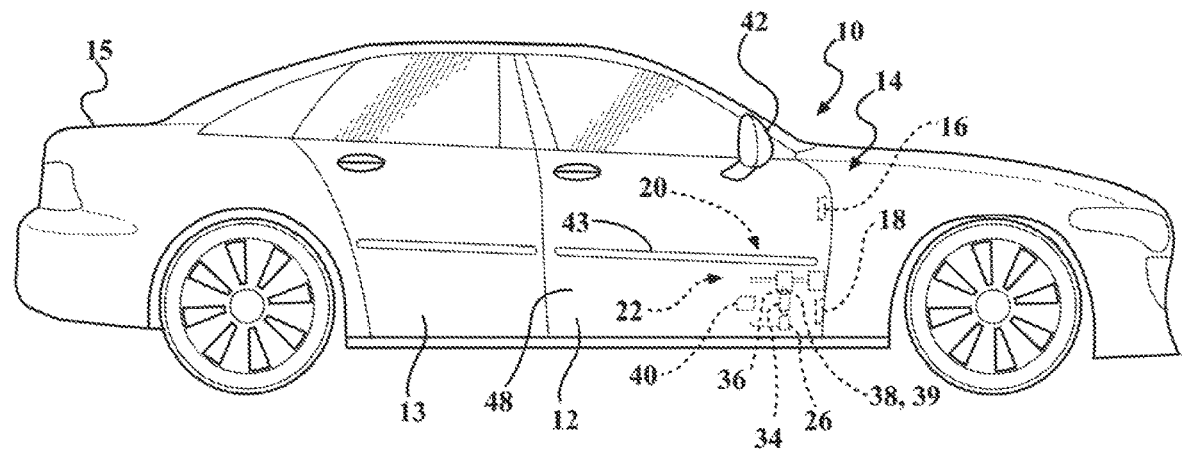
FIG. 1 is a perspective view of an example motor vehicle equipped with a power door actuation system including a power door actuator connecting a swing door and the vehicle body for operable relative movement with one another and which is constructed in accordance with the teachings of the present disclosure.

In general, at least one example embodiment of a power door actuation system having a power swing door actuator constructed in accordance with the teachings of the present disclosure will now be disclosed. The example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail, as they will be readily understood by the skilled artisan in view of the disclosure herein.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," "top", "bottom", and the like, may be used herein for ease of description to describe one element's or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated degrees or at other orientations) and the spatially relative descriptions used herein interpreted accordingly.

Referring initially to FIG. 1, an example motor vehicle 10 is shown to include a front passenger door 12 pivotally mounted to a vehicle body 14 via an upper door hinge 16 and a lower door hinge 18, which are both shown in phantom lines. In accordance with a general aspect of the present disclosure, a power door actuation system 20, also shown in phantom lines, is integrated into the pivotal connection between front passenger door 12 and a vehicle body 14. In accordance with a preferred configuration, power door actuation system 20 generally includes a power-operated swing door actuator 22 secured within an internal cavity 24 (FIGS. 2-5) of passenger door 12 and including a power-operated drive mechanism, such as an electric motor 26, by way of example and without limitation, connected to the vehicle door 12 with a rotary driven member, shown as a pinion gear 28 in a non-limiting embodiment, operably coupled thereto for rotation in response to selective actuation of the motor 26. The power swing door actuator 22 further includes a door check member, provided as an elongate rack, such as a toothed rack 30, pivotably connected to the vehicle body 14. The rotary driven member 28 is maintained in engagement with the elongate rack 30 via a retention feature, also referred to as retention member 32, wherein rotational movement of the rotary driven member 28 in a first direction causes the vehicle door 12 to move in an opening direction from the closed position toward the open position, while rotational movement of the rotary driven member 28 in a second direction causes the vehicle door 12 to move in a closing direction from the open position toward the closed position.

Each the upper door hinge 16 and lower door hinge 18 include a door-mounting hinge component and a body-mounted hinge component that are pivotably interconnected by a hinge pin or post. While power door actuation system 20 is only illustrated in association with front passenger door 12, those skilled in the art will recognize that power door actuation system 20 can also be associated with any other door or liftgate of vehicle 10 such as, by way of example and without limitation, rear passenger doors 13 and decklid 15.

Figure 2:
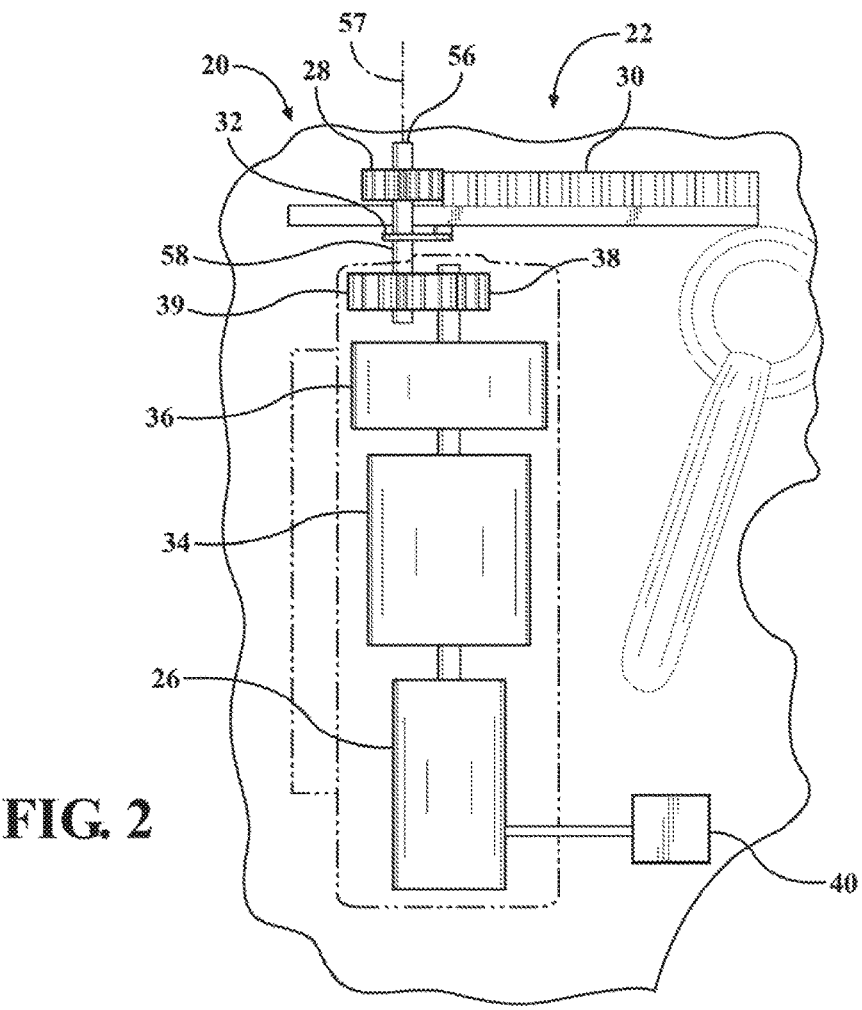
FIG. 2 is an internal view of the swing door showing the power door actuator in accordance with one aspect of the present disclosure.

Power door actuation system 20 is shown in FIG. 2 to include a power swing door actuator 22 comprised of the electric motor 26, a reduction planetary gear-train 34, an electromechanical (EM) brake 36, spur gears 38, 39, a driven pinion shaft 56 having pinion gear 28 fixed thereto, and rack 30 configured in meshed engagement with pinion gear 28, which together define the power door actuation system 20 that is mounted, at least in part, within the internal cavity 24 of door 12. An electronic control module 40 can be configured in communication with electric motor 26 for providing electric control signals thereto. Electronic control module 40 can include a microprocessor and a memory having executable computer readable instructions stored thereon.

Although not expressly illustrated, electric motor 26 can include Hall-effect sensors for monitoring a position and speed of vehicle door 12 during movement between its open and closed positions. For example, one or more Hall-effect sensors may be provided and positioned to send signals to electronic control module 40 that are indicative of rotational movement of electric motor 26 and indicative of the rotational speed of electric motor 26, e.g., based on counting signals from the Hall-effect sensor detecting a target on a motor output shaft. In situations where the sensed motor speed is greater than a threshold speed and where the current sensor registers a significant change in the current draw, electronic control module 40 may determine that the user is manually moving door 12 while motor 26 is also operating, thus moving vehicle door 12 between its open and closed positions. Electronic control module 40 may then send a signal to electric motor 26 to stop electric motor 26 and may even disengage a slip clutch (if provided). Conversely, when electronic control module 40 is in a power open or power close mode and the Hall-effect sensors indicate that a speed of electric motor 26 is less than a threshold speed (e.g., zero) and a current spike is registered, electronic control module 40 may determine that an obstacle is in the way of vehicle door 12, in which case the electronic control module 40 may take any suitable action, such as sending a signal to turn off electric motor 26. As such, electronic control module 40 can receive feedback from the Hall-effect sensors to ensure that a "contact obstacle" (contact with an obstacle) has not occurred during movement of vehicle door 12 from the closed position toward the open position, or vice versa.

Electronic control module 40 can be in communication with a remote key fob and/or with an internal/external handle switch for receiving a request from a user to open or close vehicle door 12. Put another way, electronic control module 40 can receive a command signal from either remote key fob and/or internal/external handle switch to initiate an opening or closing of vehicle door 12. Upon receiving a command, electronic control module 40 proceeds to provide a signal to electric motor 26 in the form of a pulse width modulated voltage (for speed control) to turn on electric motor 26 and initiate pivotal swinging movement of vehicle door 12. While providing the signal, electronic control module 40 also obtains feedback from the Hall-effect sensors of electric motor 26 to ensure that a contact obstacle has not occurred. If no obstacle is present, electric motor 26 will continue to generate a rotational force to drive rack 30 in the desired direction via concurrent rotation of pinion gear 28. Once vehicle door 12 is positioned at the desired location, motor 26 is turned off and the EM brake 36 causes vehicle door 12 to continue to be held at that location. If a user tries to move vehicle door 12 to a different operating position, electric motor 26 will first resist the user's motion (thereby replicating a door check function) and eventually release and allow the door 12 to move to the newly desired location. As compared with known door check systems, the present power door actuation system 20 can provide an infinite door check function, that is, the vehicle door 12 can be held in any desired location, with the pinion gear 28 being located anywhere desired along the full length of the rack 30, rather than at predetermined positions based on detents or notches formed in the rack. Again, once vehicle door 12 is stopped, electronic control module 40 will provide the required signal/power to electric motor 26 to hold it in that position. If the user provides a sufficiently large motion input to vehicle door 12 (i.e., as is the case when the user wants to close the door), electronic control module 40 will recognize this motion via the Hall effect pulses and proceed to execute a full closing operation for vehicle door 12.

Electronic control module 40 can also receive an additional input from a proximity sensor, such an ultrasonic or radar sensor positioned on a portion of vehicle door 12, such as on a door mirror 42 or the like. Ultrasonic sensor assesses if an obstacle, such as another car, tree, or post, is near or in close proximity to vehicle door 12. If such an obstacle is present, ultrasonic sensor will send a signal to electronic control module 40 and electronic control module 40 will proceed to turn off electric motor 26 to stop movement of vehicle door 12, thereby preventing vehicle door 12 from hitting the obstacle. This provides a non-contact obstacle avoidance system. In addition, or optionally, a contact obstacle avoidance system can be placed in vehicle 10 which includes a contact sensor mounted to door 12, such as in association with molding component 43, and which is operable to send a signal to electronic control module 40.

Figure 3A:
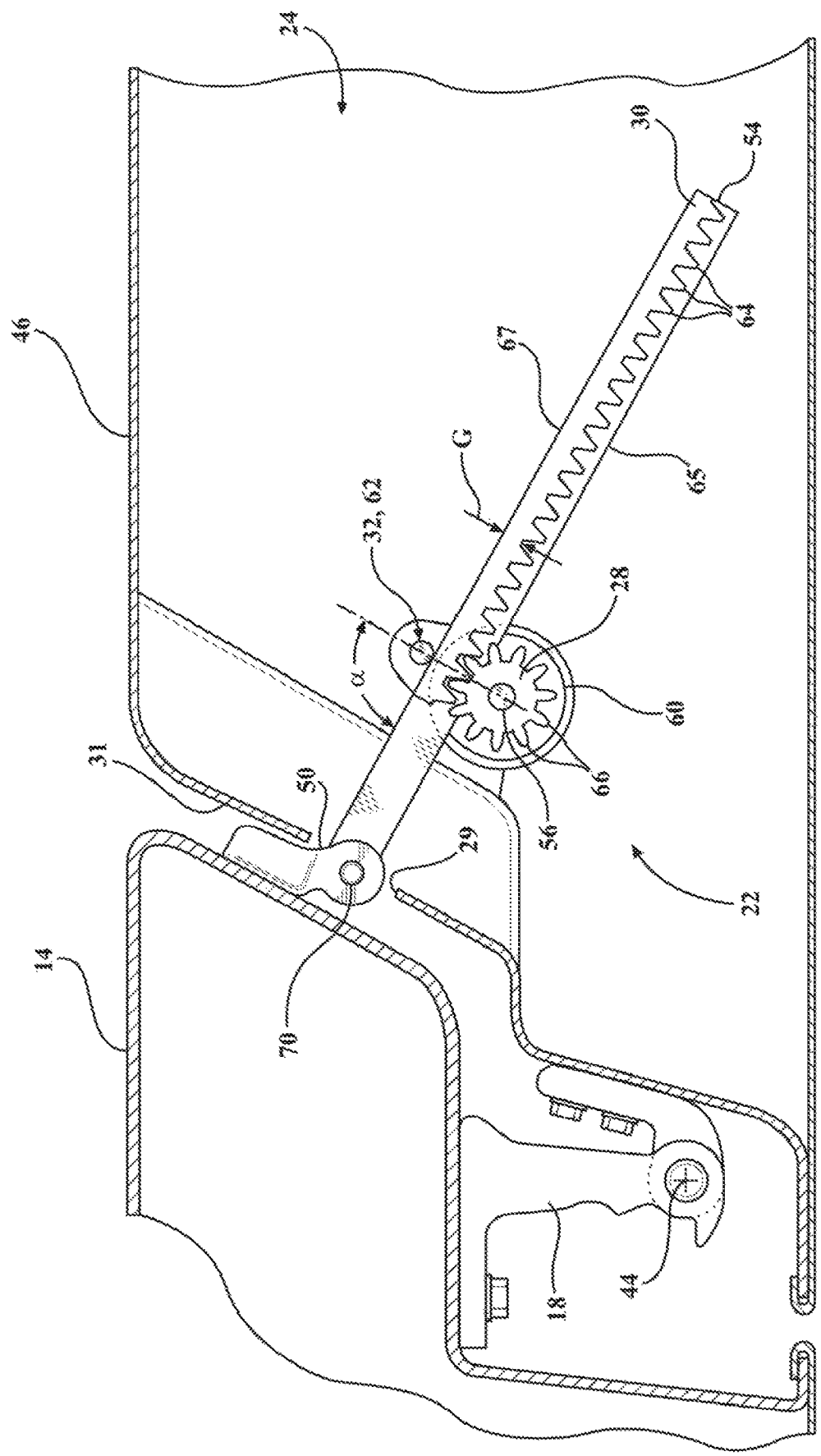
FIG. 3A is a top view of the power door actuator shown with the swing door in the closed position.
Figure 3B:
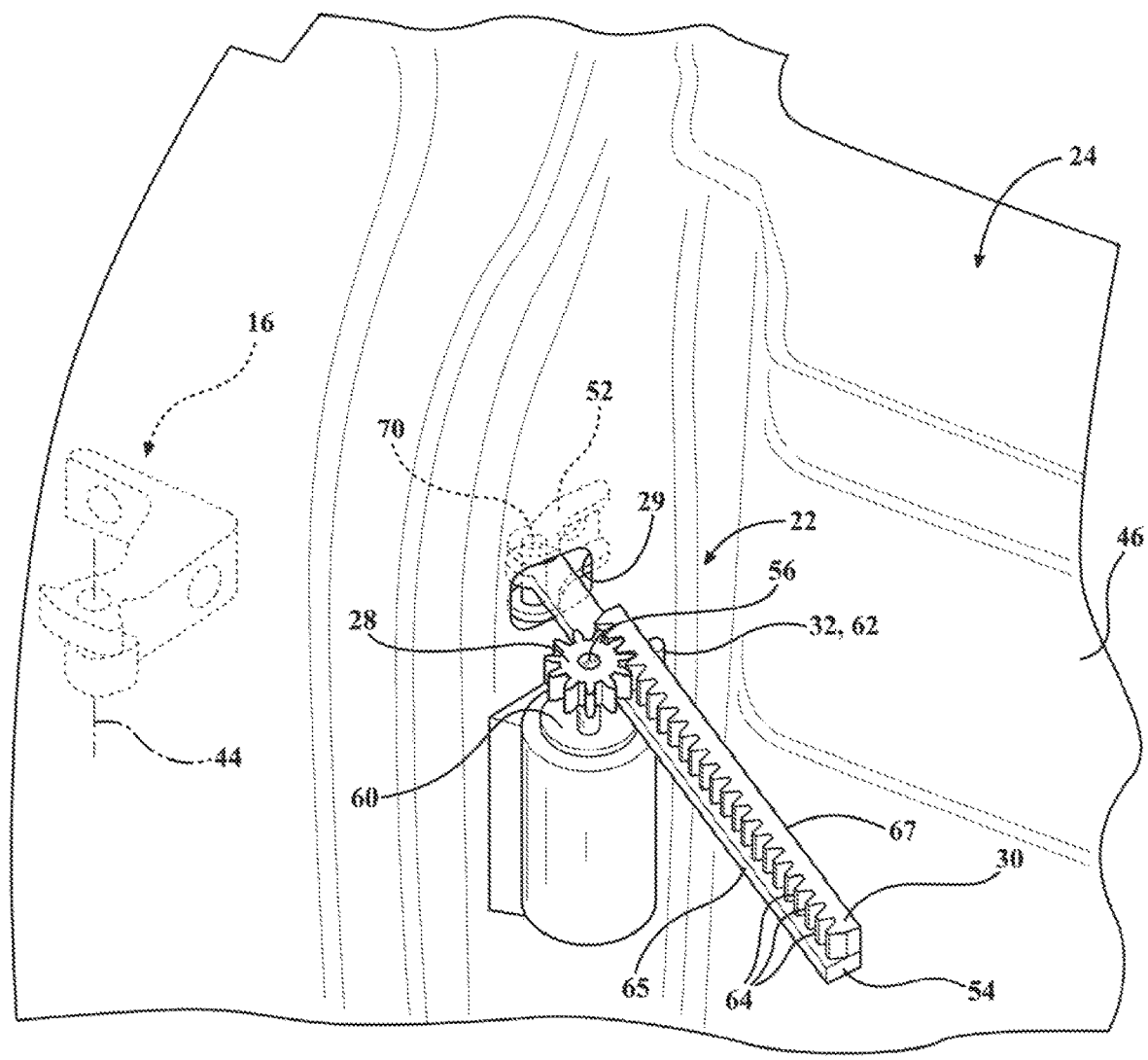
FIG. 3B is a perspective view of the power door actuator as shown in FIG. 3A.
Figure 4A:
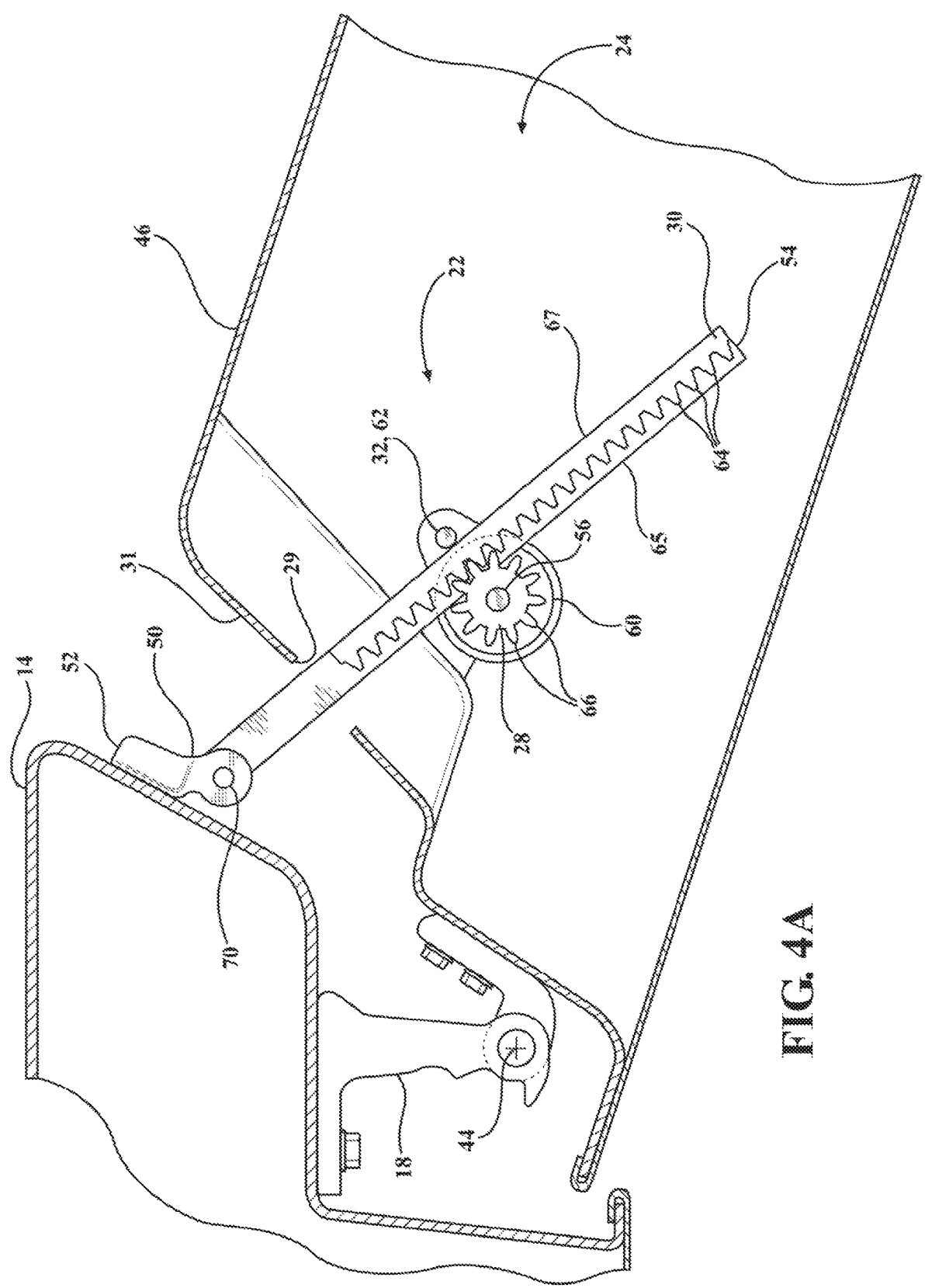
FIG. 4A is a top view of the power door actuator shown with the swing door between the closed and open positions.
Figure 4B:
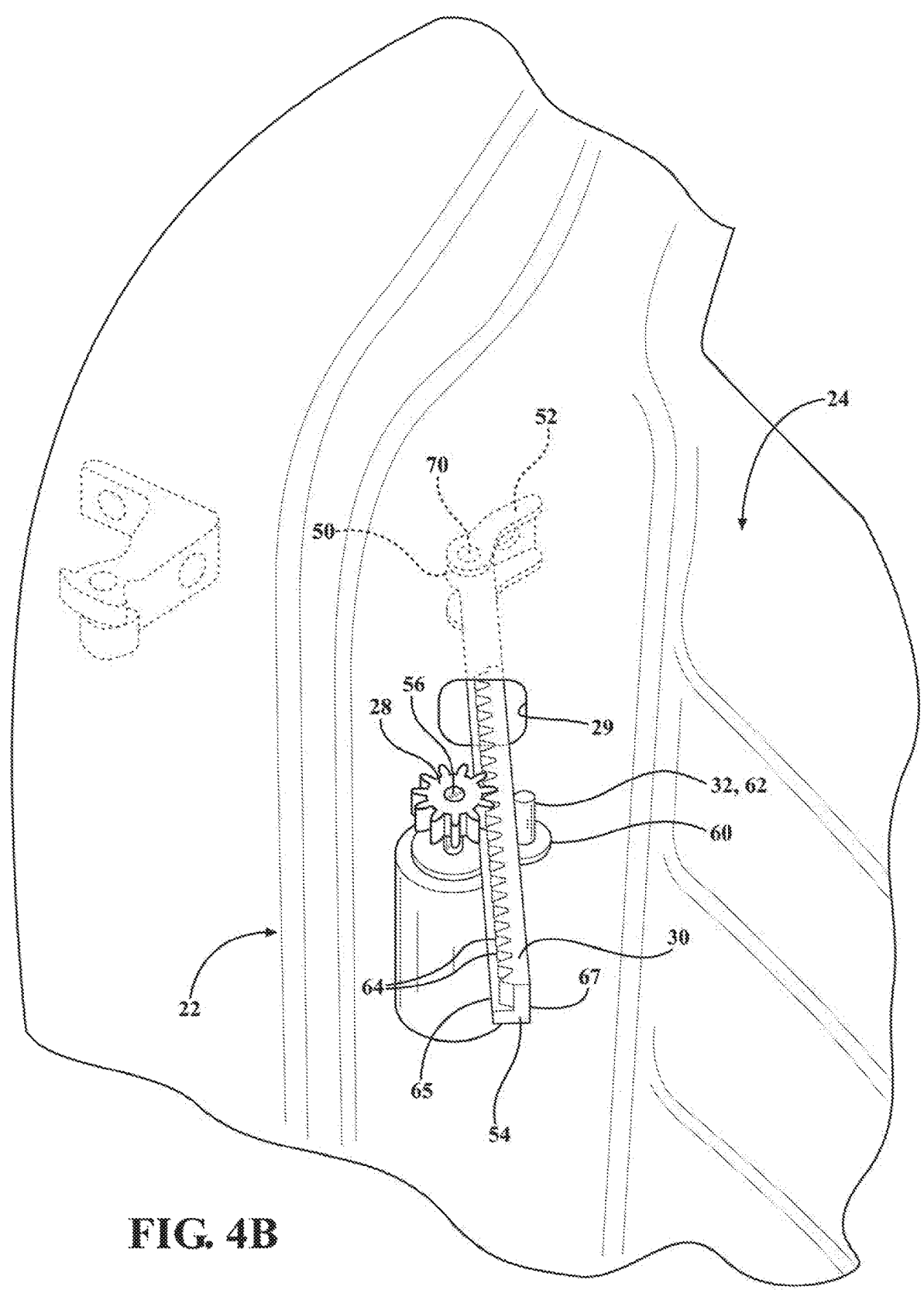
FIG. 4B is a perspective view of the power door actuator as shown in FIG. 4A.

FIGS. 3A-5A and corresponding FIGS. 3B-5B show a non-limiting embodiment of power swing door actuator 22 in various stages of operation to move vehicular swing door 12 between a closed position, an intermediate open position, and a fully-open position, respectively. The swing door 12 is pivotally mounted on hinges 16, 18 which are connected to the vehicle body 14 for rotation about a vertical axis 44 (FIG. 3B).

The swing door 12 includes inner and outer sheet metal panels 46 and 48 defining internal cavity 24. The power swing door actuator 22 may be mounted within internal cavity 24. A first terminal end, also referred to as proximal end 50, of rack 30 is pivotally mounted to the vehicle body 14, such as to an A-pillar and/or B-pillar via a mount bracket 52, wherein the rack 30 extends in cantilevered fashion horizontal, or generally horizontally (intended to mean transversely or substantially transversely relative to vertical axis 44, with substantially transversely indicating that slight inclination of rack 30 relative to vertical axis 44, e.g. 1-30 degrees, is contemplated herein as being within the intended scope) to an unsupported, free second terminal end, also referred to as distal end 54. Rack 30 illustratively extends through a port 29 provided on the shut face 31 connecting inner and outer sheet metal panels 46.

The power swing door actuator 22 is configured for incorporation into an existing door structure without need for modification, or at the most, slight modification without great effort or cost, particularly door structures originally set-up for a door check system having a purely mechanical rack and pinion system. The motor 26, gear-train 34, EM brake 36, spur gears 38, 39 and pinion gear 28 can all be supported within the internal cavity 24 of the door 12, such as via attachment to the inner panel 46, by way of example and without limitation.

The pinion gear 28 is fixed to and driven by a pinion shaft 56, with pinion gear 28 and pinion shaft 56 forming driven member 28, with pinion gear 28 being coupled in meshed relation to the spur gear 39, wherein the pinion shaft 56 extends along a pinion shaft axis, also referred to as pinion axis 57 (FIG. 2), and can be provided having an increased diameter portion attached to the spur gear 39 and a reduced diameter portion attached to the pinion gear 28, with a radially extending shoulder 58 transitioning the increased and decreased diameter portions with one another.

The retention member 32 has a generally planar plate 60 supported on the pinion shaft 56 for abutment with the shoulder 58 such that the reduced diameter portion of the shaft extends through an opening in the plate 60 of the retention member 32, with the opening being sized for a slightly loose fit of the reduced diameter portion therethrough. However, the opening is sized to confront the shoulder 58 to prevent the increased diameter portion from passing through the opening in the plate 60. Accordingly, the plate 60 of the retention member 32 rests on the shoulder 58 with the pinion shaft 56 being free to rotate within the opening relative to the retention member 32. In one embodiment, the plate 60 may be free to rotate about pinion axis 57 relative to the pinion shaft 56 to allow relative motion between the pinion shaft 56 and the retention member 32 to accommodate the non-linear movement of the rack 30 retained there between. In one embodiment, the retention member 32 may be biased (e.g. using a biasing member, such as a spring (not shown) towards the rack 30 to accommodate undulations of the rack 30 during movement of the door 12 while ensuring that the plurality of teeth 66 of the pinion gear 28 and teeth 64 of the gear 30 are biased into engagement with one another, the biasing member allowing the member 32 to be rotated away from the rack 30 to avoid binding between the plurality of teeth 66 of the pinion gear 28 and teeth 64 of the rack 30 while ensuring the plurality of teeth 66 of the pinion gear 28 and teeth 64 of the rack 30 remain in biased contact with each other. Alternatively, the plate 60 maybe be fixed to the door 12, with or without engagement of the plate 60 with the pinion shaft 56, so as to remain stationary relative to the pinion shaft 56 to maintain a fixed relationship between the pinion shaft 56 and the retention member 32. The retention member 32 has an upstanding post 62 extending generally transversely to the plane of plate 60. The post 62 is spaced from the opening in the plate 60 a predetermined distance to define a predefined space or gap G (FIG. 3A) between the post 62 and the pinion gear 28, wherein gap G is sized for receipt of rack 30 therein, as discussed further below.

The rack 30 has a plurality of teeth 64 extending along its length adjacent and facing a first side 65 of rack 30, wherein the teeth 64 are configured for close meshed engagement with a plurality of teeth 66 of the pinion gear 28. With the teeth 64, 66 being fully meshed with one another, a second side 67 of rack 30, opposite the first side 65, is brought into close proximity or line-to-line abutment with the post 62 of the retention member 32 so that the rack 30 is prevented from moving out of meshed engagement with the pinion gear 28. As such, the teeth 64, 66 are prevented from moving out from meshed engagement with one another. Accordingly, the gap G has a dimension to ensure the aforementioned meshed engagement of the teeth 64, 66 is maintained as pinion gear 28 rotates and translates along the length of rack 30.

Figure 6:
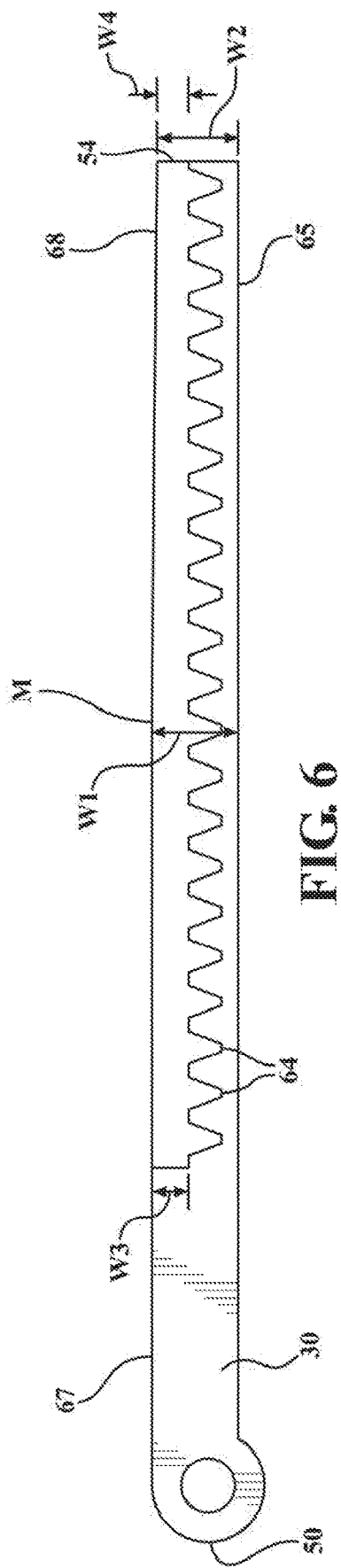
FIG. 6 is a side view of an elongate toothed rack of the power door actuator constructed in accordance with one aspect of the present disclosure.

To facilitate smooth operation and to prevent unwanted binding or increased frictional resistance within the system 20, as best shown in FIG. 6, the second side 67 of the rack 30 can have a gradual, constant tapered surface 68 extending along at least a portion of the second side 67. The tapered surface 68 is shown in a non-limiting embodiment as starting at about a mid-region M of the rack 30, between the opposite ends 50, 54, and gradually tapering toward the distal end 54 along a constant inclination relative to a portion of side 67 extending from the mid-region M to the proximal end 50. Accordingly, a width W of the rack 30 extending between the opposite first and second sides 65, 67 gradually decreases from the mid-region M toward the distal end 54, such that a first W1 at the mid-region is greater than a second width W2 at the distal end 54, with the W gradually decreasing from W1 to W2. Alternatively, the width if the teeth 64 gradually decreases from the mid-region M toward the distal end 54, such that a third W3 at the mid-region is greater than a fourth width W4 at the distal end 54.

Figure 5A:
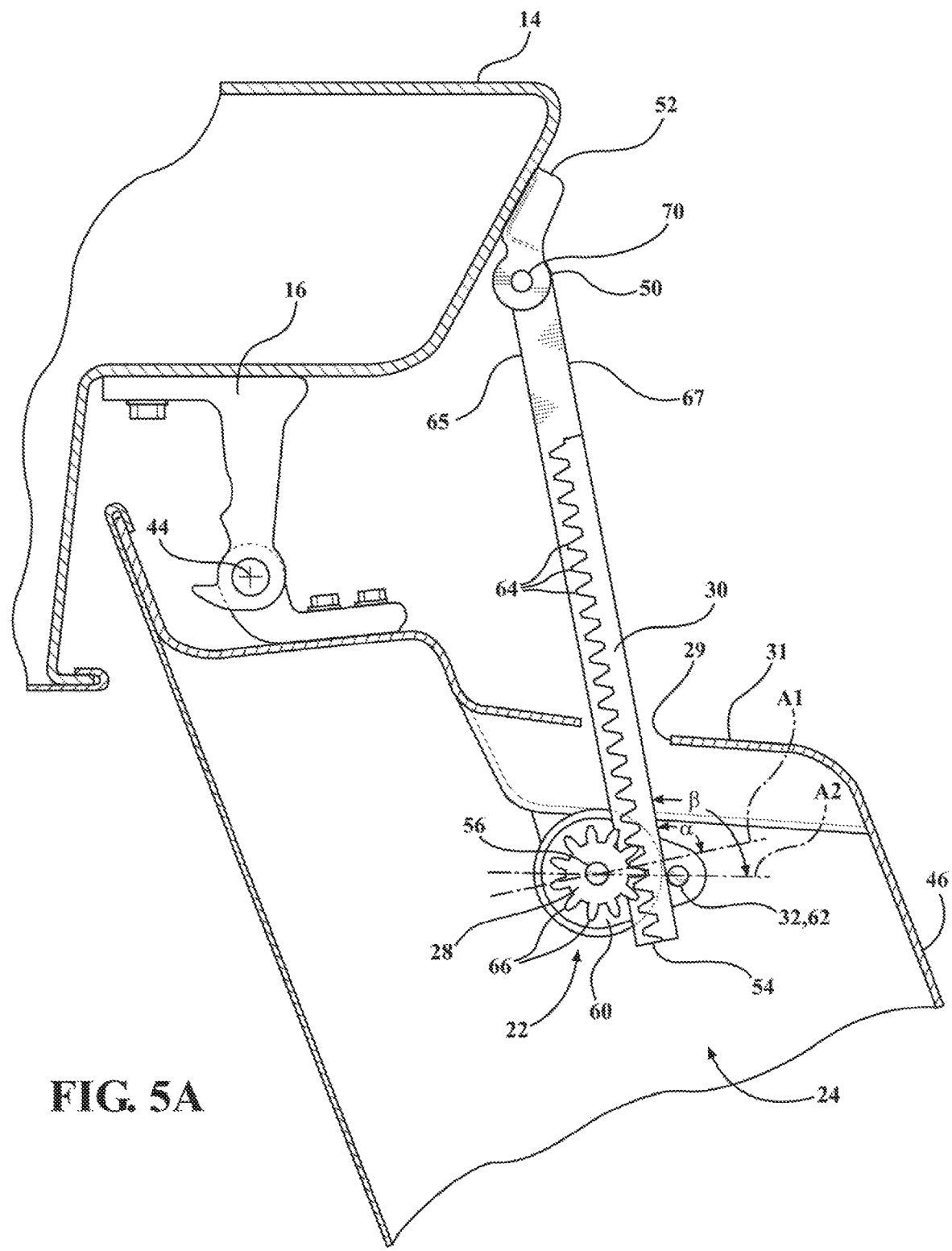
FIG. 5A is a top view of the power door actuator shown with the swing door in the open position.
Figure 5B:
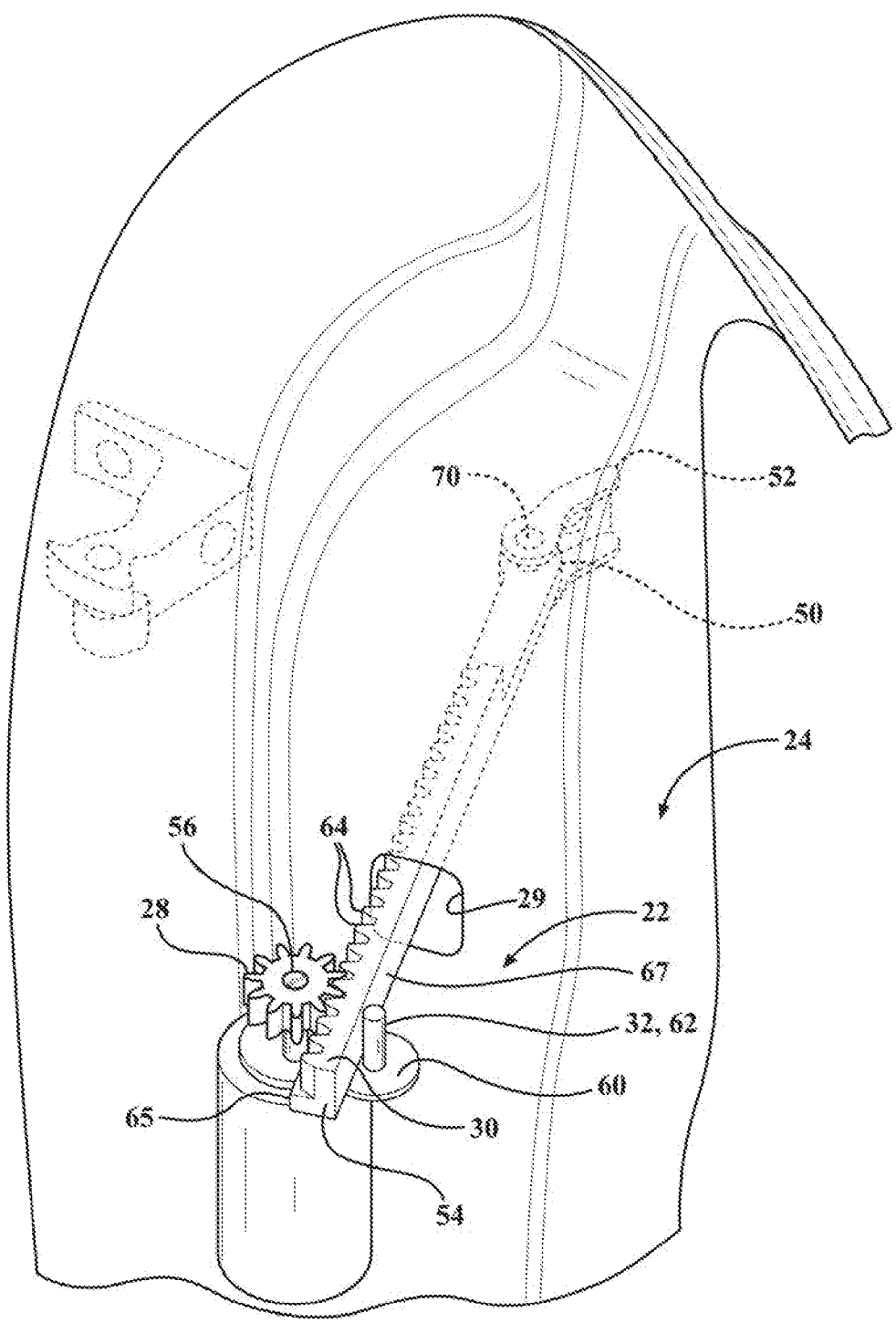
FIG. 5B is a perspective view of the power door actuator as shown in FIG. 5A.

The gradually tapered surface 68 or rack 30 accommodates an effective increase in the width of the rack 30 extending along a line through the respective centers of the pinion shaft 56 and the retention member post 62 if the rack 30 were not tapered. As the rack 30 pivots during pivotal movement of door 12, the longitudinal axis of side 67 of rack 30 rotates from an otherwise transverse relation relative to an axis Al passing through the respective centers of the pinion shaft 56 and the retention member post 62, as shown via angle a (90 degrees) in FIG. 3A, to angle β (greater than 90 degrees) as shown in FIG. 5A, and thus, the effective dimension of gap G provided to accommodate the teeth 64 of rack decreases, and thus, without the tapered surface 68, binding of the rack 30 between pinion gear 28 and retention member 32 would result. The angle β is established as a result of the rack 30 moving along a non-linear path (non-linear path is depicted in FIGS. during the door opening movement as the rack 30 pivots on the mount bracket 52 connected to the vehicle body 14, such as to the A or B-pillars.

Figure 7:
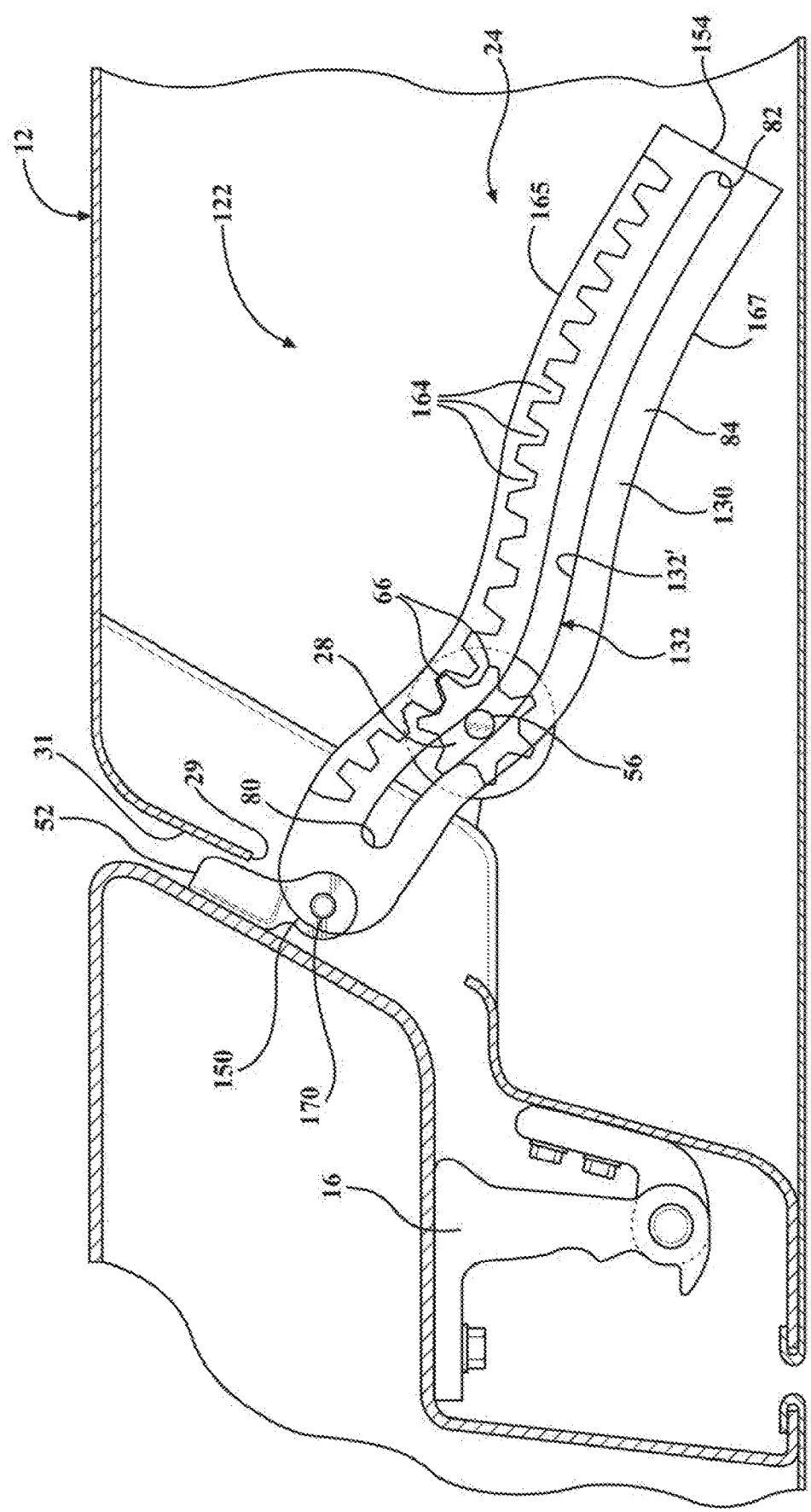
FIGS. 7-9 are views similar to FIGS. 3A-5A illustrating a power door actuator in accordance with another aspect of the present disclosure incorporating the elongate toothed rack of FIG. 6A.

In use, with the door 12 in the closed position, the pinion gear 28 is nearer the proximal end 50 of the rack 30 than it is the distal end 54. Then, as the door 12 is opened via selective actuation of the motor 26, (e.g. example by control of an ON/OFF voltage applied to the motor 26, through pulse width modulation signals issued by electronic control module 40), the pinion gear 28 is rotatably driven and caused to translate along the length of the rack 30, toward the distal end 54, until the desired degree of door opening has been reached. As the pinion gear 28 traverses the length of the rack 30, the rack 30 is caused to pivot (e.g. in a undulating/oscillating motion, such as a non-linear undulating/oscillating motion) about a rack mount pin 70 fixed to the mount bracket 52 immediately adjacent proximal end 50, and due to an offset between the vertical axis 44 about which the door 12 is hinged and mount pin 70, the pinion shaft 56 and pinion gear 28 is caused to traverse an arced, non-linear path, shown as being generally S-shaped (FIG. 7). The ability of the rack 30 to freely pivot and traverse the arced path, and while remaining in constant distance with the pinion shaft 56, is facilitated by the single post 62 of the retention member 32, by the rack 30 being cantilevered from proximal end 50, and further by the tapered surface 68, for reasons discussed above, thereby resulting in minimal losses due to friction, constant meshed engagement of the plurality of teeth 66 of the pinion gear 28 with teeth 64 of the rack 30 to eliminate binding between the plurality of teeth 66 of the pinion gear 28 and pinion gear 28 and also disengagement e.g. slippage between the plurality of teeth 66 of the pinion gear 28 and teeth 64 of the rack 30. As such, with minimal frictional losses resulting throughout the power door actuation system 20, the motor 26 and other associated components can be reduced in size, component strength and weight, and power capability, thereby reducing space requirements needed to house the system 20 and reducing the costs associate with components and assembly thereof.

Figure 8:
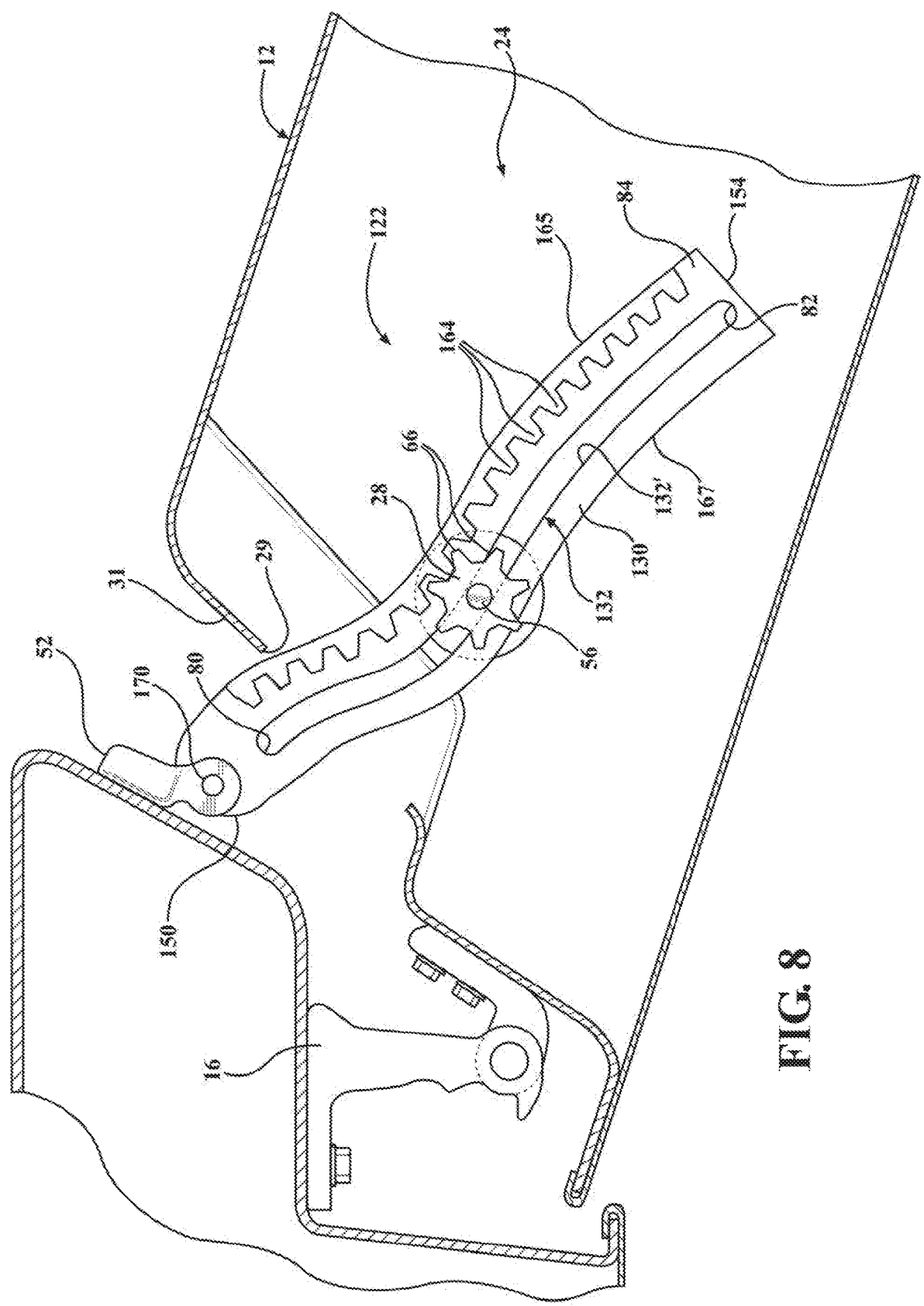
Figure 9:
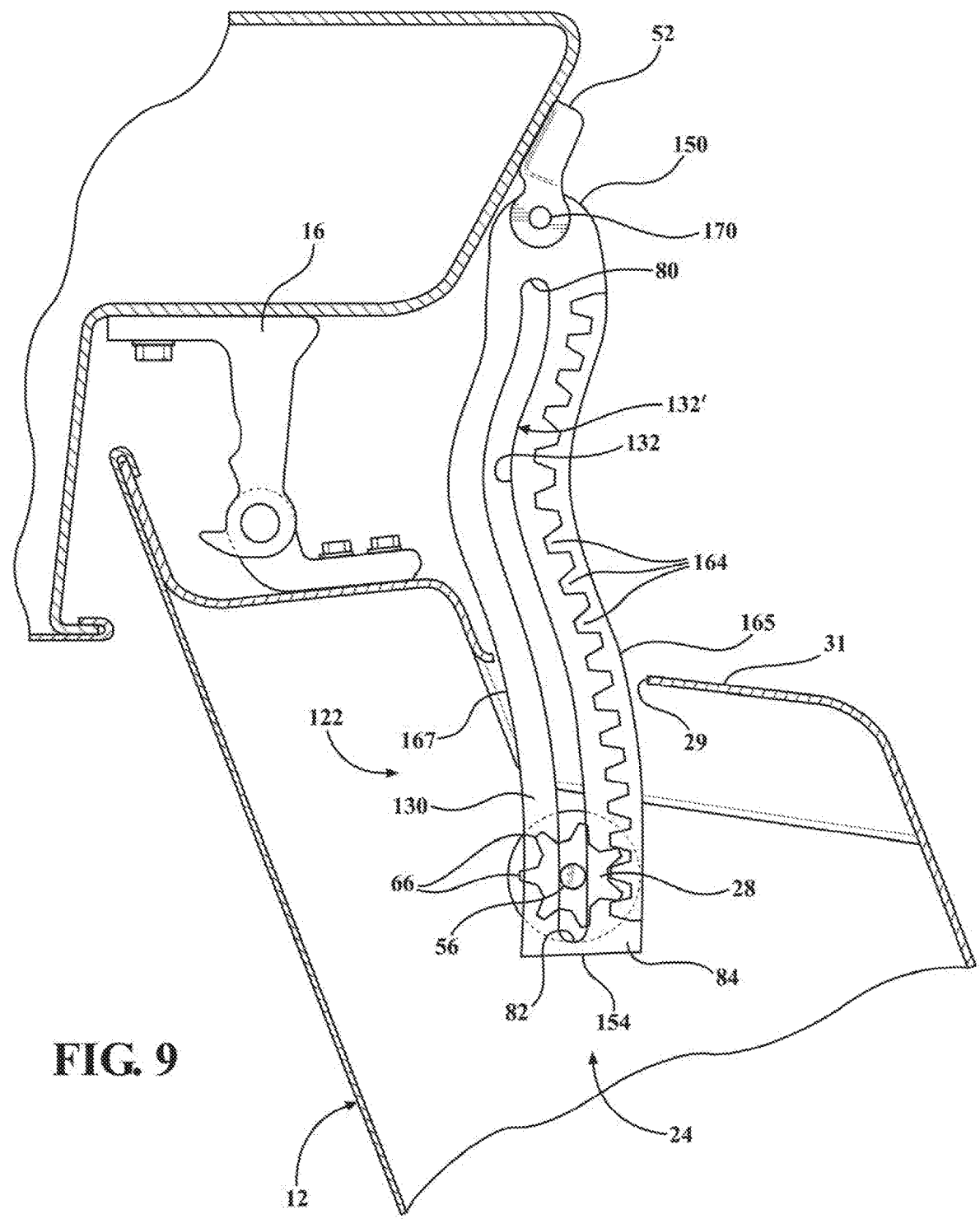

FIGS. 7-9 show a non-limiting embodiment of power swing door actuator 122 constructed in accordance with another aspect of the disclosure in various stages of operation to move vehicular swing door 12 between a closed position, an intermediate open position, and a fully-open position, respectively. The same reference numerals as used above for power swing door actuator 22, offset by a factor of 100, are used to identify like features. The swing door 12 is the same as discussed above, with the exception to the power swing door actuator 122 as discussed further below, and thus, discussion of features other than those directed to power swing door actuator 122 is believed unnecessary.

The power swing door actuator 122 may be mounted within internal cavity 24, as discussed above for power swing door actuator 22, with a first terminal end, also referred to as proximal end 150, of a door check member, provided as a rack 130 being pivotally mounted to the vehicle body 14, such as to an A-pillar and/or B-pillar via a mount bracket 52, wherein the rack 130 extends generally in cantilevered fashion horizontally to an unsupported second terminal end, also referred to as distal end 154.

As discussed above, rotary driven member, provided by pinion gear 28 and pinion shaft 56 fixed thereto, is coupled to the spur gear 39 via pinion gear 28, wherein the pinion shaft 56 extends along pinion shaft axis 57.

Figure 6A:
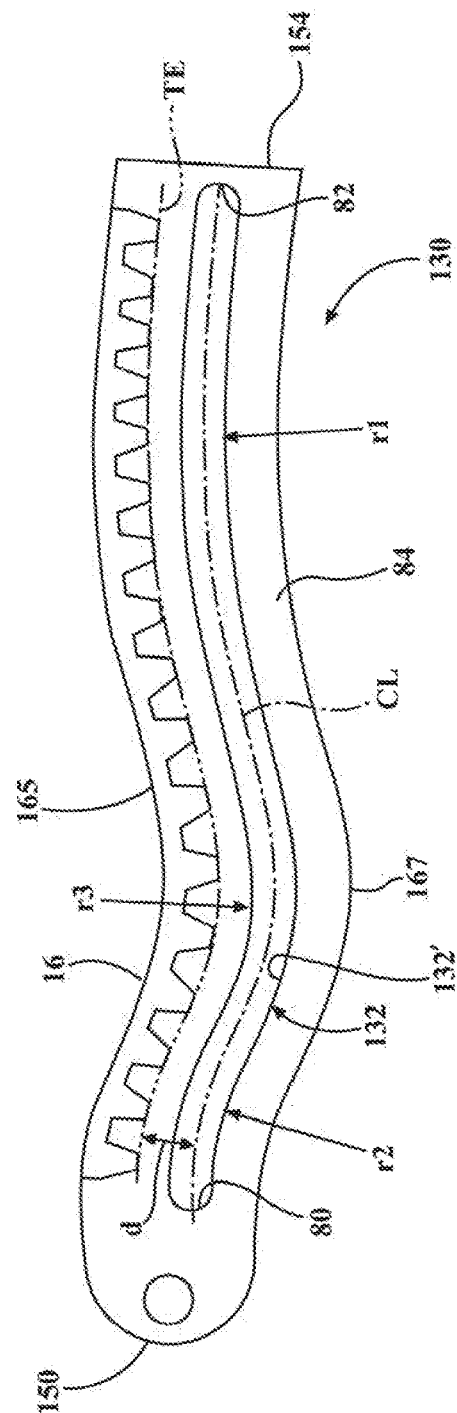
FIG. 6A is a view similar to FIG. 6 illustrating an elongate toothed rack in accordance with one aspect of the present disclosure.
Figure 10:
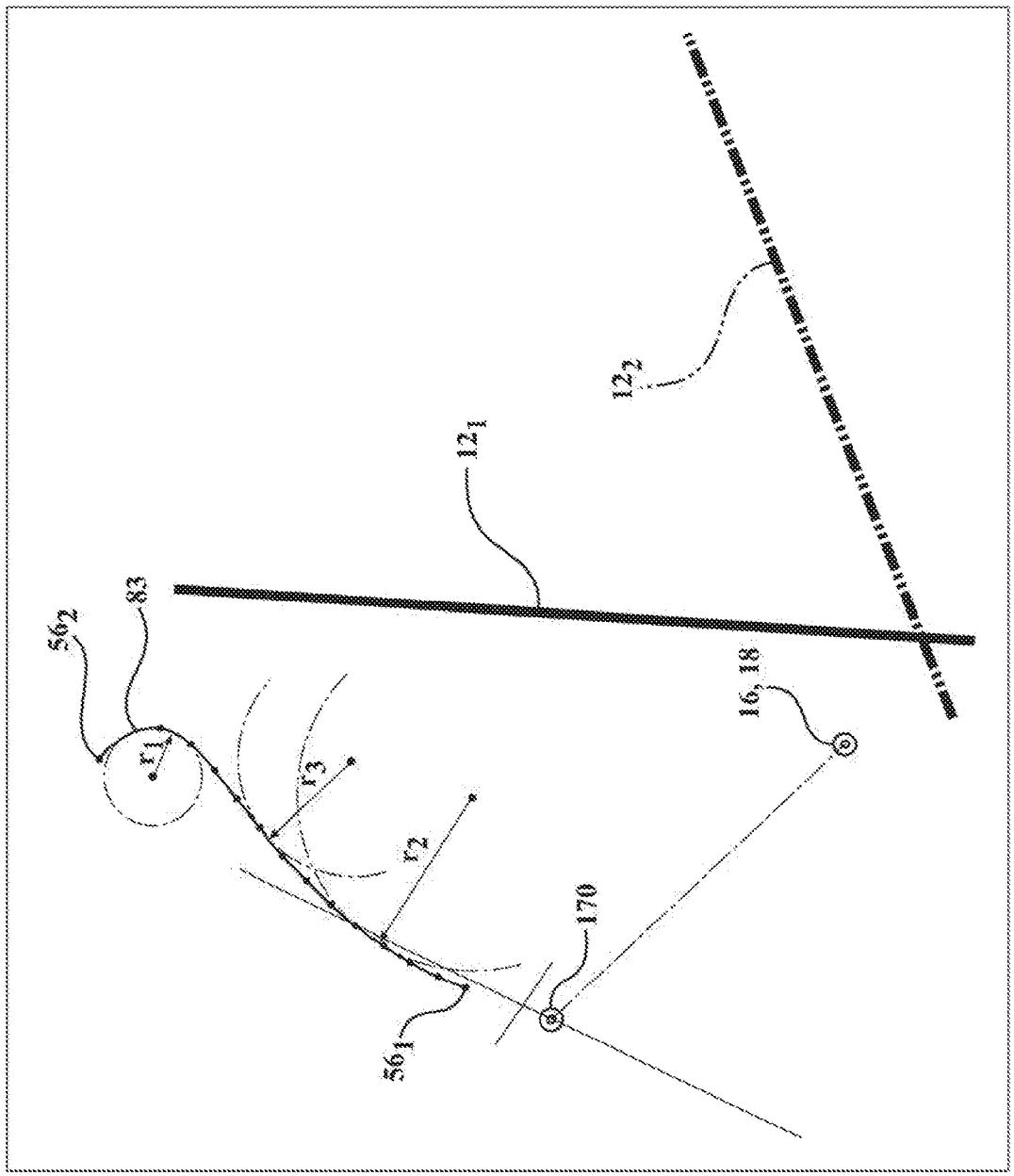
FIG. 10 is a diagram illustrating a trajectory of a door check member of a power door actuator in accordance with one aspect of the present disclosure.
Figure 11:
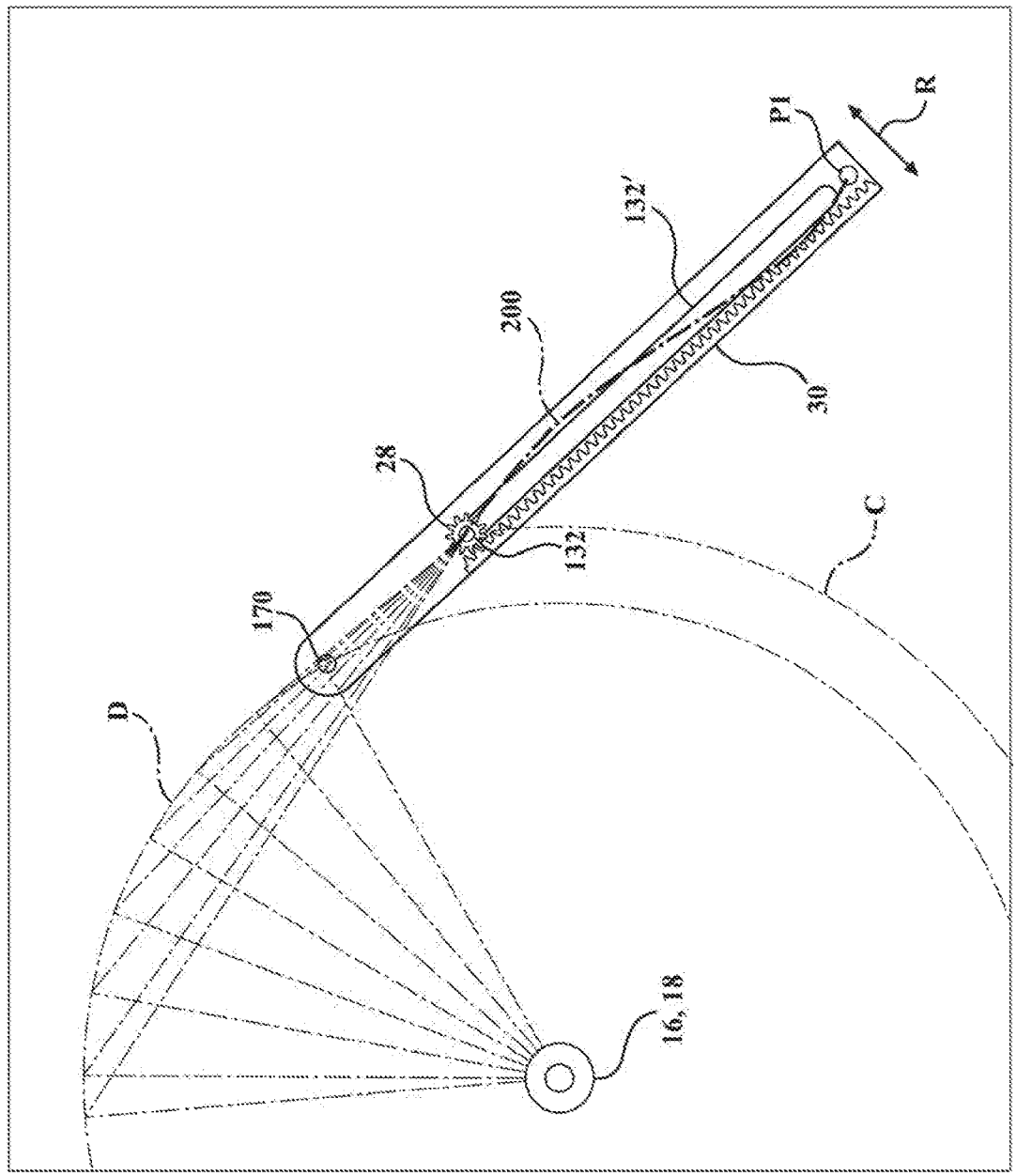
FIG. 11 is a diagram illustrating relative pivoting movements of a motor vehicle swing door and a door check member and the trajectory of a driven member of a power door actuator along the door check member during movement of the swing door between closed and opened positions in accordance with one aspect of the present disclosure.

The power door swing actuator 122 includes a retention feature, also referred to as retention member 132, shown as being formed as an integral feature of rack 130. Retention member 132 is formed as a through slot 132' extending along a length of rack 132. Through slot 132' extends through the material of the rack 130 lengthwise along a non-linear (non-straight), serpentine path between opposite ends 80, 82 intermediate opposite first and second sides 165, 167 following in generally parallel relation the opposite sides 165, 167, by way of example and without limitation, and following in generally parallel relation the teeth 164. Accordingly, the path along which through slot 132' extends follows a path which teeth 164 extend, in laterally spaced relation therefrom, and thus, as shown in FIG. 6A, a central axis, also referred to as centerline (CL), of through slot 132' remains spaced from a scribed path (TE) along which the teeth 164 follow, with the scribed path TE being shown as extending in tangent relation with terminal ends of teeth 164. The scribed path TE is maintained in laterally spaced relation from centerline CL over a constant distance (d) along the full length of through slot 132'. Further, centerline CL also follows a non-linear, generally S-shaped trajectory (FIG. 10) along which the pinion shaft 56 and pinion gear 28 naturally traverse during a door opening and closing event due to a lateral offset between upper and lower door hinges 16, 18 and a rack mount pin 170 about which rack 130 pivots. As shown in FIG. 10, the generally S-shaped trajectory 83, and thus, the path along which centerline CL extends and which driven pinion shaft 56 follows between a first position where driven pinion shaft $56_1$ corresponds to a closed door $12_1$ position, and a second position where driven pinion shaft $56_2$ corresponds to an open door $12_2$ position, has varying radii of curvature, such that a radius (r1) adjacent distal end 154 can be different than a radius (r2) adjacent proximal end 150, while a radius (r3) intermediate r1 and r2 can be different than r1 and r2. It is recognized that the radii r1, r2, r3, may have higher radii than shown in FIG. 10. This allows rack 130 to pivot naturally about pinion gear 28 during a door opening and closing event, thereby preventing binding of rack 130 with pinion gear 28. With reference to FIG. 11, there is shown diagrammatically the undulating non-linear path 200 followed by an illustrative reference point P1 of rack 30 as the rack 30 pivots about rack mount pin 170, as the door 12 (not shown) pivots about hinges 16, 18, as the pinion gear 28 drives the rack 30 to impart pivoting of the door 12, and as the pinion shaft 56 is guided through slot 132' along a fixed distance C. Distal end 154 is allowed to reciprocate R to ensure the constant meshed engagement of teeth 164 with plurality of teeth 66 of the pinion gear 28 in a manner as previously described hereinabove. For illustrative reasons only to show the undulating or oscillating motion of the rack 30 in FIG. 11, the rack 30 is shown in motion relative (e.g. rack mount pin 170 is shown to follow path D) to the fixed pivot point of the door about hinges 16, 18, and a fixed shaft axis 57 centered about door about hinges 16, 18

Teeth 164 are provided to extend upwardly from a planar surface 84 of rack 130 and to extend along the length of rack 130 adjacent first side 165 and facing a second side 167 of rack 130, wherein the teeth 164 are configured for close meshed engagement with a plurality of teeth 66 of the pinion gear 28 as pinion gear 28 traverses the full length of through slot 132'. With the teeth 164, 66 being fully meshed with one another, pinion shaft 56 is disposed within through slot 132' for close sliding receipt therein along the full length of through slot 132'. Although pinion shaft 56 is free to slide lengthwise within through slot 132' along centerline CL, minimal play (slop) is provided in a lateral direction extending transversely to centerline CL toward opposite sides 165, 167, and thus, teeth 164, 66 remain in optimally uniform meshed engagement with one another, thus, preventing teeth 164, 66 from moving laterally toward and away from one another, while door 12 is pivoting to promote smooth, low-friction rolling of pinion gear 28 along rack 130 during as door 12 moves from the closed position to the open position and vice versa. As such, the teeth 164, 66 are prevented from moving out from meshed engagement with one another.

The foregoing description of the embodiments has been provided for purposes of illustration and description. It is not intended to be exhaustive or to limit the disclosure. Individual elements, assemblies/subassemblies, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A power swing door actuator for pivoting a vehicle door relative to a vehicle body about a first axis between a closed position and an open position, the power swing door actuator comprising:

a power-operated drive mechanism configured for attachment to the vehicle door;

a rotary driven member coupled to said power-operated drive mechanism for rotation in response to selective actuation of said power-operated drive mechanism; and
an elongate rack extending between a proximal end and a distal end, said proximal end being configured for connection to the vehicle body for pivotal movement about a second axis spaced from the first axis; and
a retention feature;
wherein said rotary driven member is configured to be maintained in engagement with said elongate rack by said retention feature, wherein rotational movement of said rotary driven member in a first direction causes the vehicle door to pivot in an opening direction from the closed position toward the open position and said retention feature permitting said elongate rack to oscillate about said second axis as said rotary driven member traverses along a non-linear path, while rotational movement of the rotary driven member in a second direction causes the vehicle door to move in a closing direction from the open position toward the closed position and said rotary driven member to traverse along said elongate rack along said non-linear path.

2. The power swing door actuator of claim 1, wherein said rotary driven member is a pinion gear and said elongate rack has a plurality of teeth maintained in meshed engagement with said pinion gear by said retention feature.

3. The power swing door actuator of claim 2, wherein said elongate rack has a first side and an opposite second side extending from said proximal end to said distal end, said first side facing said pinion gear and said second side having a tapered surface.

4. The power swing door actuator of claim 3, wherein said retention feature engages said second side and traverses said tapered surface as said vehicle door moves between the open position and closed position.

5. The power swing door actuator of claim 3, wherein said pinion gear is fixed to a pinion shaft and said retention feature is supported on said pinion shaft for relative rotation therewith.

6. The power swing door actuator of claim 3, wherein said tapered surface forms a width extending from said first side to said second side, said width constantly decreases along a direction extending toward said distal end.

7. The power swing door actuator of claim 1, wherein said elongate rack has a first side and an opposite second side extending from said proximal end to said distal end, said retention feature being formed as a through slot configured for receipt of a shaft of said rotary driven member for translation therein, said through slot having an elongate, non-linear centerline extending between said proximal end and said distal end intermediate said first side and said second side.

8. The power swing door actuator of claim 7, wherein said rotary driven member includes a pinion gear fixed to said shaft and said elongate rack has a plurality of teeth maintained in meshed engagement with said pinion gear by said retention feature, wherein said teeth extend along a path in parallel relation with said centerline.

9. The power swing door actuator of claim 8, wherein said centerline has a generally S-shaped trajectory.

10. The power swing door actuator of claim 9, wherein said generally S-shaped trajectory of said centerline has varying radii of curvature.

11. A vehicle door having a power swing door actuator for pivoting the vehicle door relative to a vehicle body about a first axis between a closed position and an open position, the power swing door actuator comprising:

a power-operated drive mechanism configured for attachment to the vehicle door;
a rotary driven member coupled to said power-operated drive mechanism for rotation in response to selective actuation of said power-operated drive mechanism; and
an elongate rack extending between a proximal end and a distal end, said proximal end being configured for connection to the vehicle body for pivotal movement about a second axis spaced from the first axis; and
a retention feature;
wherein said rotary driven member is configured to be maintained in engagement with said elongate rack by said retention feature, wherein rotational movement of said rotary driven member in a first direction causes the vehicle door to pivot in an opening direction from the closed position toward the open position and said rotary driven member to traverse along said elongate rack along a non-linear path, while rotational movement of the rotary driven member in a second direction causes the vehicle door to move in a closing direction from the open position toward the closed position and said rotary driven member to traverse along said elongate rack along said non-linear path.

12. The vehicle door of claim 11, wherein said rotary driven member is a pinion gear and said elongate rack has a plurality of teeth maintained in meshed engagement with said pinion gear by said retention feature.

13. The vehicle door of claim 12, wherein said elongate rack has a first side and an opposite second side extending from said proximal end to said distal end, said first side facing said pinion gear and said second side having a tapered surface, wherein said retention feature engages and traverses said tapered surface as said vehicle door moves between the open position and closed position.

14. The vehicle door of claim 13, wherein said tapered surface forms a width extending from said first side to said second side, said width decreases along a direction extending toward said distal end.

15. The vehicle door of claim 11, wherein said elongate rack has a first side and an opposite second side extending from said proximal end to said distal end, said retention feature being formed as a through slot configured for receipt of a shaft of said rotary driven member for translation therein, said through slot having an elongate, non-linear centerline extending between said proximal end and said distal end intermediate said first side and said second side.

16. The vehicle door of claim 15, wherein said rotary driven member includes a pinion gear fixed to said shaft and said elongate rack has a plurality of teeth maintained in meshed engagement with said pinion gear by said retention feature, wherein said teeth extend along a path in parallel relation with said centerline.

17. The vehicle door of claim 16, wherein said centerline has a generally S-shaped trajectory.

18. The vehicle door of claim 17, wherein said generally S-shaped trajectory of said centerline has varying radii of curvature.

19. The vehicle door of claim 18, wherein said generally S-shaped trajectory has a first radius of curvature adjacent said proximal end and a second radius of curvature adjacent said distal end, said first radius of curvature being different from said second radius of curvature.

20. A method for pivoting a vehicle door relative to a vehicle body about a first axis between a closed position and an open position, comprising:

attaching a power-operated drive mechanism to the vehicle door;

connecting proximal end of an elongate rack to the vehicle body and configuring said proximal end for pivotal movement about a second axis spaced from the first axis;

driving a rotary driven member coupled to said power-operated drive mechanism in response to selective actuation of said power-operated drive mechanism to cause the vehicle door to move between the open position and close position as said rotary driven member traverses along said elongate rack;

maintaining said rotary driven member in engagement with said elongate rack using a retention feature; and permitting said elongate rack to oscillate about the second axis as the rotary driven member traverses along the elongate rack.

* * * * *